(No Model.) 4 Sheets—Sheet 1.

C. W. JUDSON.
MACHINE FOR MAKING SHEET METAL BLANKS.

No. 383,302. Patented May 22, 1888.

WITNESSES:
Chas. B. Shumway,
William J. Lum.

INVENTOR,
Charles W. Judson.
By George D. Seymour.

(No Model.) 4 Sheets—Sheet 2.

C. W. JUDSON.
MACHINE FOR MAKING SHEET METAL BLANKS.

No. 383,302. Patented May 22, 1888.

WITNESSES:
Chas. B. Shumway
William J. Lum.

INVENTOR,
Charles W. Judson
By Geo. W. Seymour
Atty.

(No Model.) 4 Sheets—Sheet 3.

C. W. JUDSON.
MACHINE FOR MAKING SHEET METAL BLANKS.

No. 383,302. Patented May 22, 1888.

WITNESSES:
Chas. B. Shuman
William J. Lum

INVENTOR.
Charles W. Judson
By Geo. D. Seymour
Atty.

(No Model.) 4 Sheets—Sheet 4.
C. W. JUDSON.
MACHINE FOR MAKING SHEET METAL BLANKS.
No. 383,302. Patented May 22, 1888.
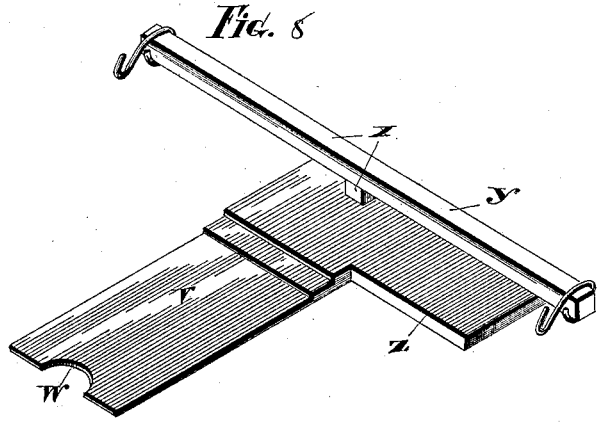
WITNESSES:
INVENTOR,
Charles W. Judson,
By Geo. D. Seymour,
Atty.

UNITED STATES PATENT OFFICE.

CHARLES W. JUDSON, OF TERRYVILLE, CONNECTICUT, ASSIGNOR TO THE EAGLE LOCK COMPANY, OF SAME PLACE.

MACHINE FOR MAKING SHEET-METAL BLANKS.

SPECIFICATION forming part of Letters Patent No. 383,302, dated May 22, 1888.

Application filed April 23, 1887. Renewed April 5, 1888. Serial No. 269,662. (No model.)

*To all whom it may concern:*

Be it known that I, CHARLES W. JUDSON, residing at Terryville, in the county of Litchfield and State of Connecticut, have invented certain new and useful Improvements in Machines for Making Sheet-Metal Blanks; and I do declare the following to be a full, clear, and exact description of the same, reference being had to the accompanying drawings, which form a part of this specification.

My invention relates to an improvement in that class of machinery for making sheet-metal blanks and developing them in which the two operations are carried on side by side without manual interference, the object being to produce a machine of simple, compact, and durable construction, reliable feeding action adapted to have its operations always in view, and having a large capacity for accurate work.

With these ends in view my invention consists in the combination, with a press having a gate, of two dies and two punches, a reciprocating feed for feeding the blanks from one die to the other, and an actuating device carried by the gate of the press for positively actuating the feed in one direction.

My invention further consists in the combination, with two dies and two punches, of a reciprocating feed for feeding the blanks from one die to the other, and a spring-actuated follower located in one punch and projecting from the working-face thereof to give right direction to the blanks before the feed and hold them until the same has them under control.

My invention further consists in certain details of construction and combinations of parts, as will be hereinafter described, and pointed out in the claims.

Figure 1:
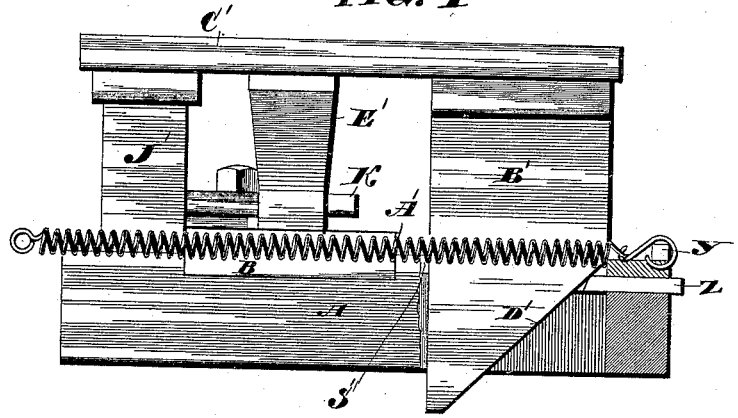
Figure 2:
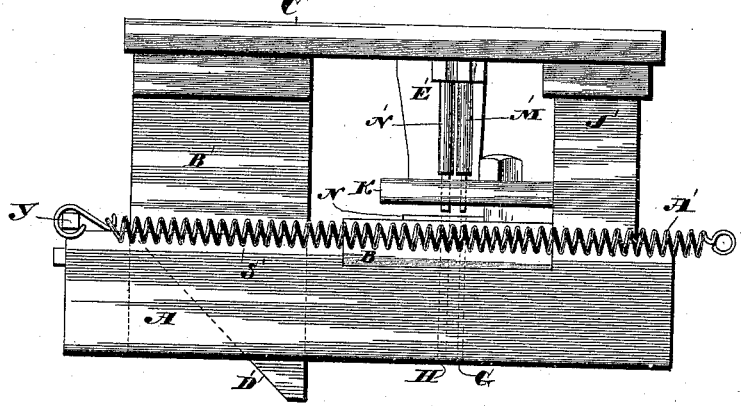
Figure 3:
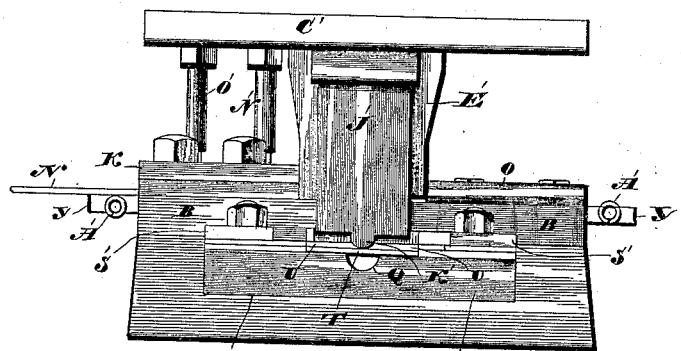
Figure 4:
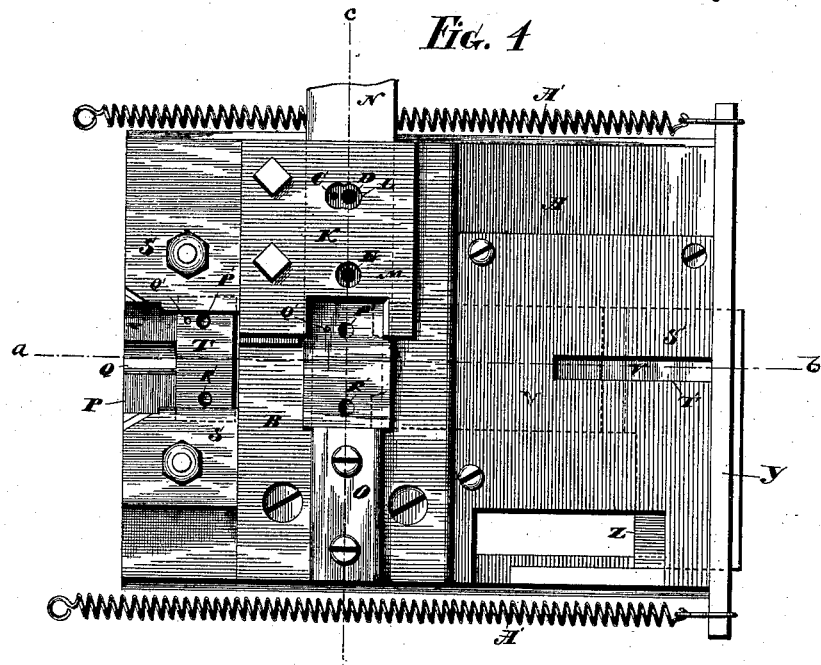
Figure 5:
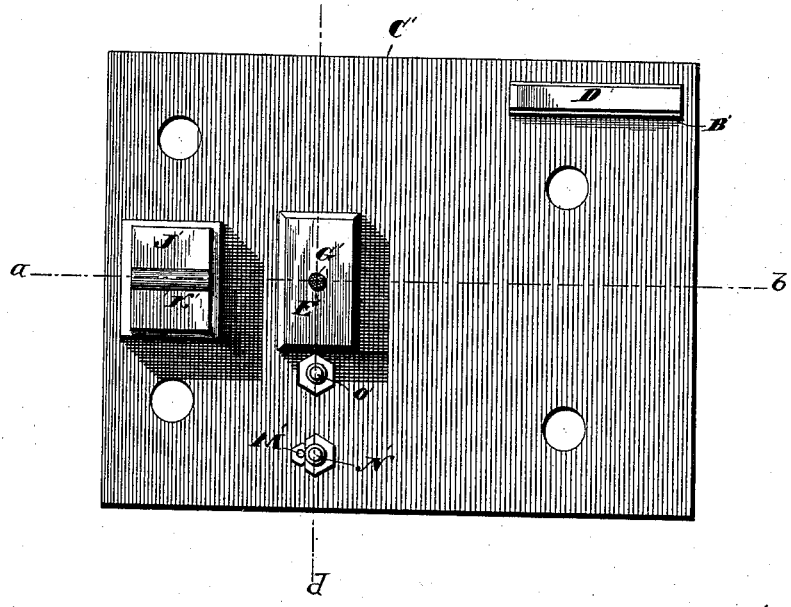
Figure 6:
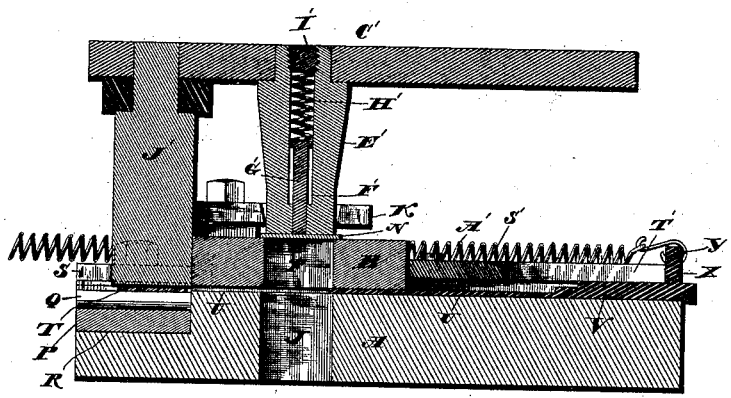
Figure 7:
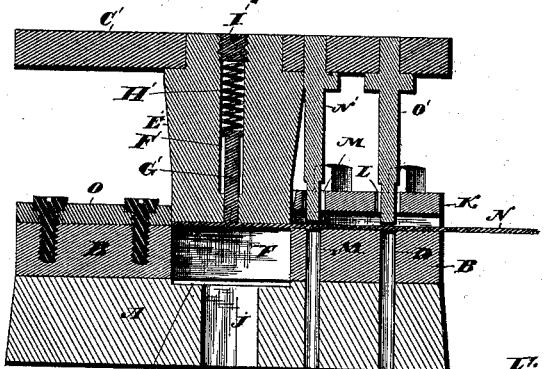
Figure 9:
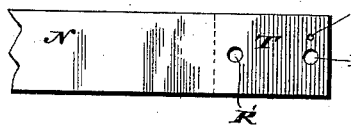
Figure 10:
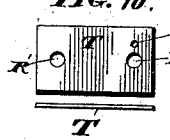
Figure 11:
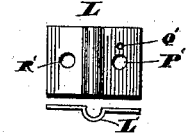

In the accompanying drawings, Figure 1 is a view, in front elevation, of a die-block and punch-plate, showing one form which my invention may assume. Fig. 2 is a rear view thereof. Fig. 3 is a view thereof in side elevation, looking toward the bending-die and the bending-punch. Fig. 4 is a plan view of the die-block and its attachments, showing a stock-strip over the blanking-opening in the blanking-die and a blank upon the bending-die. Fig. 5 is a reverse plan view of the punch-plate, showing the punches and the cam for operating the feed. Fig. 6 is a view in vertical longitudinal section on the lines $a\,b$ of Figs. 3, 4, and 5. Fig. 7 is a similar transverse section on the lines $c\,d$ of Figs. 4 and 5. Fig. 8 is a detached perspective view of the feed. Fig. 9 is a broken view of the forward end of the stock-strip after the same has been punched, the broken line marking the amount of stock required for the formation of a blank. Fig. 10 includes a plan and an edge view of a blank, and Fig. 11 is a similar view showing it after it has been bent.

As herein shown, my invention is applied to making parts for friction-hinges and thereto perforating a sheet-metal stock-strip, cutting it into blanks, and forming a bend or fold in each of them.

The die-block is designed to be mounted in the bed of a press of any approved construction, and is adapted thereto. A die, B, mounted upon such block, is provided with circular punch-holes C, D, and E and with an oblong blanking-opening, F, located in line with the same. Openings G, H, I, and J, formed in the die-block and located below and in line with the said holes and the said opening in the die, are provided for the escape of the scrap cut from and punched out of the stock. A guard, K, bolted to the rear edge of the said die and provided with openings L and M, located above the punch-holes aforesaid, stands sufficiently above the working-face of the die to permit the stock-strip N to be fed under it and over the said face of the die. A gage, O, located at the forward end of the die and in line with the said punch-holes and blanking-opening, gages the feeding of the stock-strip.

A bending-die, P, provided with a groove, Q, is located at one side of the blanking-die B in a recess, R, formed in the die-block, its upper or working face being slightly below the lower face of the blanking die. Removable and adjustable guides S, secured to the die-block and located on either side of the bending-die, guide the blanks T and hold them in place thereupon. A passage or guideway, U, formed in the die-block, is provided for the transference of the blanks to the bending-die after they have been formed in the blanking-die. This passage is adapted in its dimensions to have a blank lie lengthwise across it, and extends transversely under the blanking-die in line with the blanking-opening and the bending-die, its floor being on the same level with the working face of the latter. An automatic reciprocating feed, V, located in such passage, is provided for moving the blanks to the bending-die. Its inner end is cut away, as at W, and its outer end provided with a post, X, supporting a cross-bar, Y, the ends of which extend beyond the rear and forward edges of the die-block, and with a lateral extension, Z, as shown. A plate, S', secured to the die-block, holds the feed in place thereon, such plate being provided with a slot, T', in which the post X travels, and by which the inward movement of the feed is limited. Spiral springs A' A', connected in any suitable manner with the press, are respectively attached to the ends of the said cross-bar, and impart the inward movement to the feed. A cam, B', depending from the punch-plate C', is provided with an inclined face, D', which engages with the extension Z of the feed when the punch-plate makes its downstroke, and retracts the feed against the tension of the springs A' A', which gradually move it inward as the cam lifts with the upward movement of the punch-plate, which is secured to the gate of the press.

A blank-punch, E', carried by the said plate and coacting with the opening F in the blanking-die, is provided with an interior chamber, F', to receive a follower, G', shouldered at its outer end and projecting from the working-face of the punch, a spring, H', to actuate such follower, and a threaded plug, I', to hold the follower and plug in place.

A bending-punch, J', carried by the punch-plate, is provided with a lip, K', adapted to fit into the groove Q of the bending-die, with which this punch coacts in forming the bend L' in the blanks. Punches M', N', and O', also carried by the punch-plate, coact with the punch-holes C, D, and E in forming the perforations P', Q', and R' in the blanks.

Having described my invention in detail, I will now proceed to set forth the method of its operation.

Stock in the form of long strips is fed between the guard and the blanking-die. Upon the first descent of the punch-plate the punches L', M', and N' punch the holes P', Q', and R' in the end of the strip, which is then drawn forward until it meets the gage. Upon the next descent of the punch-plate the follower carried by the blanking-punch engages with the end of the strip and retires into the punch as the same descends and cuts the blank. At the same time the punches L', M', and N' perforate that portion of the strip newly brought under them by drawing it forward, as aforesaid. As soon as the blank has been cut, the follower springs from the face of the blank-punch and follows it through the opening F and into the passage or guideway U, where it is held under the tension of the follower-spring. Ordinarily the blanks will fall into the guideway, where they will be held by the follower; but in case they do not so fall, but tilt or hang, the follower will promptly force them through the opening F and into the guideway, where it will hold them, as above described. The punch-plate has meanwhile begun its upstroke, thus gradually withdrawing the face D' of the cam C' from the extension Z of the feed, which is now moved inward by the spiral springs A' A'. As the feed moves inward, its inner end engages with the blank held down by the follower and moves it along in the guideway, and finally leaves it upon the working-face of the bending-die. The follower does not release its hold upon the blank until the same is perfectly under the control of the feed, which by being cut away upon its inner end prolongs the hold of the follower upon the blank. The blanking-punch, it may be noted, barely enters the opening F and lifts before the follower, which does not reach the limit of its outstroke until the punch clears the blanking-die. When the punch-plate descends again, the inclined face D' of the cam C' engages with the extension Z of the feed and retracts the same, the strip is again perforated, another blank formed, and the blank left upon the bending-die is bent. Then when the punch-plate lifts again the feed will move forward and transfer the newly-formed blank to the bending-die, where it will be bent upon the next revolution of the press, and so on. The operator stands in front of the blanking-die, or on that side thereof adjacent to the gage, and draws the stock-strip toward him and over the die-block on a line at a right angle with the feed, leaving the bending-die exposed to view all of the time, whereas heretofore the strip has been passed over the bending-die, obscuring the same to the operator with obvious disadvantage.

It is apparent that in conforming the invention to different work it will undergo some change of form. Thus the bending-die may be replaced by some other form of die for developing the blanks into form for use. I would therefore have it understood that I do not limit myself to the exact construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. The combination, with a press having a gate, of two dies and two punches, a reciprocating feed for feeding the blanks from one die to the other, and an actuating device carried by the gate of the press and positively actuating the feed in one direction, substantially as set forth.

2. The combination, with two dies and two punches, of a reciprocating feed for feeding the blanks from one die to the other, a cam connected with the gate of the press for sliding the feed in one direction, and a spring connected with the feed for moving it in the opposite direction, substantially as set forth.

3. The combination, with two dies and two punches, of a reciprocating feed for feeding the blanks from one die to the other, and provided with an extension and a cross-bar, a cam carried by the gate of the press and engaging with the said extension to slide the feed in one direction, and springs connected with the cross-bar to slide the feed in the opposite direction, substantially as set forth.

4. The combination, with two dies located side by side, of a reciprocating feed located in line with such dies and transverse to the line on which the stock-strip is fed over the blanking-die, whereby one die is exposed to view, substantially as set forth.

5. The combination, with two dies and two punches, of a reciprocating feed for feeding the blanks from one die to the other, and a spring-actuated follower located in one punch and projecting from the working-face thereof to give right direction to the blanks before the feed and hold them until the same has them under control, substantially as set forth.

6. The combination, with two dies and two punches, of a yielding follower mounted in one of the punches and projecting from its working-face, and a reciprocating feed having its inner end cut away to escape the follower, which gives right direction to the blanks and holds them until they are under the control of the feed, substantially as set forth.

In testimony whereof I have signed this specification in the presence of two subscribing witnesses.

CHARLES W. JUDSON.

Witnesses:
    JASON C. FENN,
    H. B. PLUMB.